United States Patent
Halbert

(10) Patent No.: US 10,208,222 B2
(45) Date of Patent: Feb. 19, 2019

(54) COMPOUND FOR PROTECTING WORK SURFACES

(71) Applicant: Scott Halbert, Bastrop, TX (US)

(72) Inventor: Scott Halbert, Bastrop, TX (US)

(*) Notice: Subject to any disclaimer, the term of this patent is extended or adjusted under 35 U.S.C. 154(b) by 0 days.

(21) Appl. No.: 15/478,018

(22) Filed: Apr. 3, 2017

(65) Prior Publication Data

US 2018/0282568 A1   Oct. 4, 2018

(51) Int. Cl.
| | | |
|---|---|---|
| *C09D 5/00* | (2006.01) |
| *B05D 1/02* | (2006.01) |
| *C09D 107/00* | (2006.01) |
| *C09D 201/00* | (2006.01) |
| *C09D 7/63* | (2018.01) |
| *C09D 7/61* | (2018.01) |
| *C08K 13/02* | (2006.01) |

(52) U.S. Cl.
CPC ............. *C09D 107/00* (2013.01); *B05D 1/02* (2013.01); *C09D 5/00* (2013.01); *C09D 7/61* (2018.01); *C09D 7/63* (2018.01); *C09D 201/00* (2013.01); *C08K 13/02* (2013.01)

(58) Field of Classification Search
USPC .......................................... 524/87
See application file for complete search history.

(56) References Cited

U.S. PATENT DOCUMENTS 2,702,285 A * 2/1955 Bebb .................... C09D 125/10
524/158
2007/0295247 A1 * 12/2007 Remortel .............. C09C 1/0084
106/481

* cited by examiner

*Primary Examiner* — Deve E Valdez
(74) *Attorney, Agent, or Firm* — Derek R. Van Gilder

(57) ABSTRACT

A compound for creating a protective coating on a surface. The compound includes a natural rubber liquid mixture. The compound also includes a latex paint added to the natural rubber liquid mixture.

20 Claims, 4 Drawing Sheets

COMPOUND FOR PROTECTING WORK SURFACES

CROSS-REFERENCE TO RELATED APPLICATIONS

Not applicable.

BACKGROUND OF THE INVENTION

Construction and remodeling projects often result in damage to nearby surfaces. For example, during kitchen remodeling debris, paint, grout, caulking, etc. may get on existing countertops. This then must be cleaned or otherwise removed from the countertop. In some cases, cleaning may not be possible and instead either the surface may need to be replaced or repainted.

In order to prevent this damage, often something is placed on a surface to protect it. For example, plastic or paper coverings are often placed on surfaces to ensure that any potential damage is mitigated. That is, the covering takes some of the damage, leaving the surface relatively protected. However, this is often inadequate. For example, if a plastic covering has even a small hole then paint or other liquids can leak through, damaging whatever needed protection. Often, this damage is not discovered until it is far too late to mitigate the damage. Similarly, these coverings don't protect against impact damage. I.e., impacts pass through the covering damaging the surface underneath.

Likewise, when painting it is common to use masking tape to prevent paint from getting on a surface. For example, at a corner between a ceiling and a wall a typical methodology is to carefully place tape along the ceiling prior to painting. The wall is then painted. When the paint is dry the tape is then removed, which ideally creates a nice straight line. However, in practice often the tape can damage the ceiling, may not stick correctly which leads to "bleeding" or the removal of the tape can damage the new paint applied to the wall.

There are coatings that can be placed on surfaces, but these coatings suffer from a number of drawbacks. For example, the coating might only work on certain surfaces. In particular, porous surfaces often cannot be treated. Further, these coatings may need certain chemicals to be removed. Thus, even if the coating can be applied to the surface, the chemicals used to remove the coating may damage the underlying surface, preventing the use on those surfaces.

Accordingly, there is a need in the art for a protective coating that can be applied to a multitude of surfaces. In addition, there is a need in the art for the protective coating to be temporary, yet completely protect the surface. Further, there is a need in the art for the protective coating to be removed without the use of chemicals which could damage the underlying surface.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a compound for creating a protective coating on a surface. The compound includes a natural rubber liquid mixture. The compound also includes a latex paint added to the natural rubber liquid mixture.

Another example embodiment includes a method for producing a compound for creating a protective coating on a surface. The method includes providing a liquid natural rubber. The method also includes adding latex paint to the natural rubber. The method further includes adding one or more additives to the rubber/latex mixture.

Another example embodiment includes a method for temporarily protecting a surface using a compound for creating a protective coating. The method includes providing a protective compound. The compound includes a natural rubber liquid mixture. The compound also includes a latex paint added to the natural rubber liquid mixture. The method also includes applying the protective compound to a surface. The method further includes allowing the protective compound to cure.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. When a percentage is recited as "less than" a certain percentage then it shall mean that the compound includes the ingredient in some amount not to exceed the stated percentage.

Figure 1:
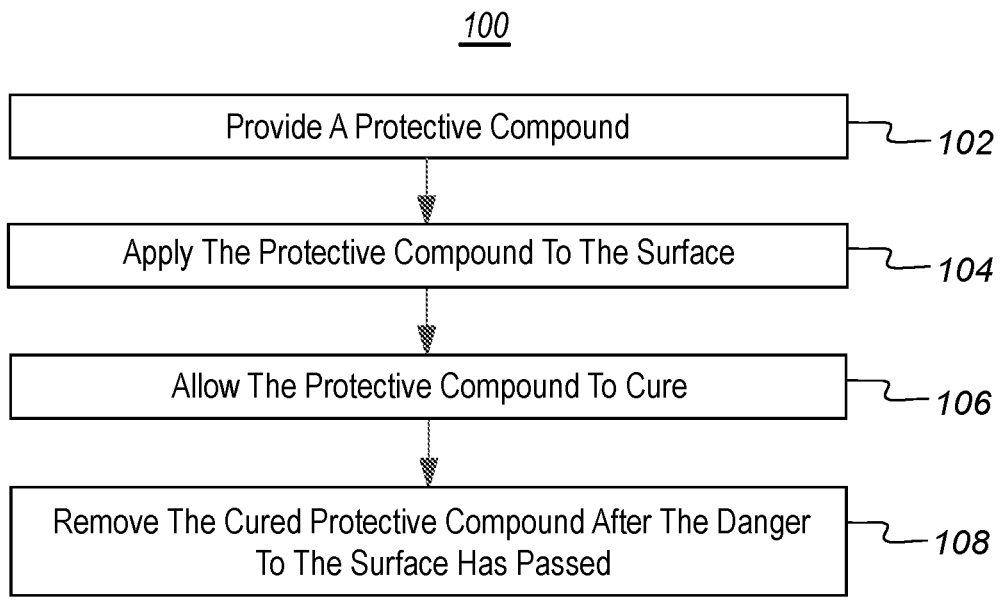
FIG. 1 illustrates a method of temporarily protecting a surface.

FIG. 1 illustrates a method 100 of temporarily protecting a surface. The method 100 allows the surface to be completely, but temporarily, covered and thus protected from chemicals, paints, moisture, physical damage, etc. The covering is then completely removed after the danger to the surface is no longer an issue. Since the covering removes without any residue, the surface is restored to its initial condition. For example, if a user desires to paint a wall to a corner with another wall, the covering can be placed on a wall which should not be painted, paint the wall, then remove the covering, leaving the protected surface unpainted.

FIG. 1 shows that that the method 100 can include providing 102 a protective compound. The protective compound is a liquid in its uncured state. That is, the protective compound is made up of tiny vibrating particles of matter, such as atoms, held together by intermolecular bonds. Like a gas, a liquid is able to flow and take the shape of a container in which the liquid is placed.

FIG. 1 also shows that the method 100 can include applying 104 the protective compound to the surface. Applying 104 the protective compound to the surface can include any desired application method, such as spraying, pouring, brushing, etc. The protective compound partially or completely covers the surface. However, since the protective compound does not include liquids, oils or other chemicals that can interact with the surface, the surface remains unaffected by the presence of the protective compound. The protective compound has sufficient viscosity that friction and low level electrical interactions are enough to keep the compound in place after application 104. The viscosity of a fluid is a measure of its resistance to gradual deformation by shear stress or tensile stress. For liquids, it corresponds to the informal concept of "thickness"; for example, honey has a much higher viscosity than water.

One if skill in the art will appreciate that applying 104 the protective compound to the surface can including one or more supplemental protective devices. For example, the uncured protective compound can be used to adhere paper or wood above the surface to be protected. Since the protective compound won't stick to the supplemental protective devices then the supplemental protective device can be easily removed when needed.

FIG. 1 further shows that the method 100 can include allowing 106 the protective compound to cure. The time that the protective compound must be allowed 106 to set depends on the amount of protective compound applied 104. I.e., the thicker the coating of protective compound applied 104, the longer the protective compound must be allowed to set. After setting, the protective compound forms a solid. A solid is characterized by structural rigidity and resistance to changes of shape or volume. Unlike a liquid, a solid object does not flow to take on the shape of its container, nor does it expand to fill the entire volume available to it like a gas does. The atoms in a solid are tightly bound to each other, either in a regular geometric lattice or irregularly. Thus, the protective compound forms a solid layer covering the surface after setting.

FIG. 1 additionally shows that the method 100 can include removing 108 the cured protective compound after the danger to the surface has passed. In particular, the cured protective compound 108 is removed 108 by peeling the protective compound off of the surface. Since the protective compound did not form any chemical bonds to the surface or otherwise interact with the surface, other than through friction and minor electrical interactions, the cured protective compound peels from the surface, exposing the protected surface. The cured protective compound can then be disposed of using proper methods.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
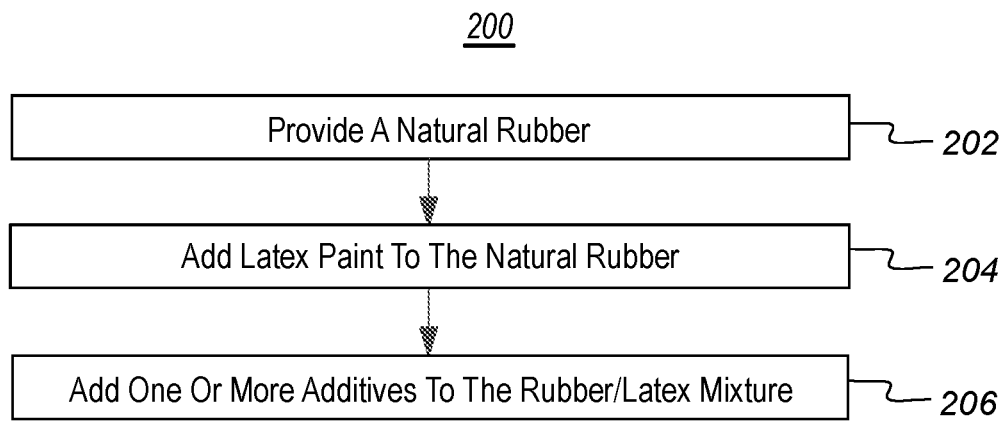
FIG. 2 illustrates a method of creating a protective compound.

FIG. 2 illustrates a method 200 of creating a protective compound. The protective compound is used to provide a protective coating to a surface. In particular, the protective compound is applied to a surface and, after setting, can be easily removed to expose the surface when desired.

FIG. 2 shows that the method 200 can include providing 202 a natural rubber. Natural rubber is used extensively in many applications and products, either alone or in combination with other materials. In most of its useful forms, it has a large stretch ratio and high resilience, and is extremely waterproof. The natural rubber can be from any desired latex producing plant. For example, the major commercial source of natural rubber latex is the Pará rubber tree (*Hevea brasiliensis*), a member of the spurge family, Euphorbiaceae. This species is preferred because it grows well under cultivation. A properly managed tree responds to wounding by producing more latex for several years. Congo rubber, formerly a major source of rubber, came from vines in the genus *Landolphia* (*L. kirkii*, *L. heudelotis*, and *L. owariensis*). These cannot be cultivated, and the intense drive to collect latex from wild plants was responsible for many of the atrocities committed under the Congo Free State. Dandelion milk contains latex. The latex exhibits the same quality as the natural rubber from rubber trees. In the wild types of dandelion, latex content is low and varies greatly. In 2013, by inhibiting one key enzyme and using modern cultivation methods and optimization techniques, scientists in the Fraunhofer Institute for Molecular Biology and Applied Ecology (IME) in Germany developed a cultivar that is suitable for commercial production of natural rubber. Many other plants produce forms of latex rich in isoprene polymers, though not all produce usable forms of polymer as easily as the Pará. Some of them require more elaborate processing to produce anything like usable rubber, and most are more difficult to tap. Some produce other desirable materials, for example gutta-percha (*Palaquium gutta*) and chicle from *Manilkara* species. Others that have been commercially exploited, or at least showed promise as rubber sources, include the rubber fig (*Ficus elastica*), Panama rubber tree (*Castilla elastica*), various spurges (*Euphorbia* spp.), lettuce (*Lactuca* species), the related *Scorzonera tausaghyz*, various *Taraxacum* species, including common dandelion (*Taraxacum officinale*) and Russian dandelion (*Taraxacum kok-saghyz*), and perhaps most importantly for its hypoallergenic properties, guayule (*Parthenium argentatum*). The term gum rubber is sometimes applied to the tree-obtained version of natural rubber in order to distinguish it from the synthetic version.

FIG. 2 also shows that the method 200 can include adding 204 latex paint to the natural rubber. The paint type known as Emulsion in the UK and Latex in the United States is a water-borne dispersion of sub-micrometer polymer particles. These terms in their respective countries cover all paints that use synthetic polymers such as acrylic, vinyl acrylic (PVA), styrene acrylic, etc. as binders. The term "latex" in the context of paint in the United States simply means an aqueous dispersion; latex rubber from the rubber tree is not an ingredient. These dispersions are prepared by emulsion polymerization. Such paints cure by a process called coalescence where first the water, and then the trace, or coalescing, solvent, evaporate and draw together and soften the binder particles and fuse them together into irreversibly bound networked structures, so that the paint cannot redissolve in the solvent/water that originally carried it. The residual surfactants in paint, as well as hydrolytic effects with some polymers cause the paint to remain susceptible to softening and, over time, degradation by water.

The latex paint can be used to provide coloring to the protective compound. That is, the latex paint can be used for pigmentation to change the color of the protective compound. Color on the protective compound can allow a user to easily identify any protective compound on a surface which is being protected. The ratio of latex paint to natural rubber can be between 1:32 and 1:48 of volume (i.e., one cup of latex paint for every 2-3 gallons of natural rubber).

FIG. 2 further shows that the method 200 can include adding 206 one or more additives to the rubber/latex mixture. For example, Table 1 shows additives which can be placed in the protective compound. The additives can, for example, increase the stability and/or longevity of the protective compound.

TABLE 1

Additives for a protective compound with their associated CAS number and approximate percentages.

| Chemical Name | CAS Number | Percentage |
|---|---|---|
| Ammonium Hydroxide | 1336-21-6 | 1-<3 |
| Titanium Dioxide | 13463-67-7 | 1-<3 |
| Sodium Hydroxide | 1310-73-2 | <0.2 |
| Distillates (petroleum), Hydrotrated heavy naphthenic | 64742-52-5 | <0.2 |
| Sodium Silicate | 1344-09-8 | <0.2 |
| 4' 4 Diphelmethane Diisocynate | 101-68-8 | <0.1 |
| Diethanolamine | 111-42-2 | <0.1 |
| Diphenylamine | 122-39-4 | <0.1 |
| Ethanol | 64-17-5 | <0.1 |
| Ethyl Acetate | 141-78-6 | <0.1 |
| Formaldehyde | 50-00-0 | <0.1 |
| Glycol Ethers | 111-90-0 | <0.1 |
| Methanol | 67-56-1 | <0.1 |
| Methyl Isbutyl Ketone | 108-10-1 | <0.1 |
| Naphthlene | 91-20-3 | <0.1 |
| Potassium Hydroxide | 1310-58-3 | <0.1 |
| Quinoline | 91-22-5 | <0.1 |
| Silica, quartz | 14808-60-7 | <0.1 |
| Zinc Dimethyldithiocarbamate | 137-30-4 | <0.1 |

As used in the specification and the claims, the term approximately shall mean that the value is within 10% of the stated value, unless otherwise specified.

Figure 3:
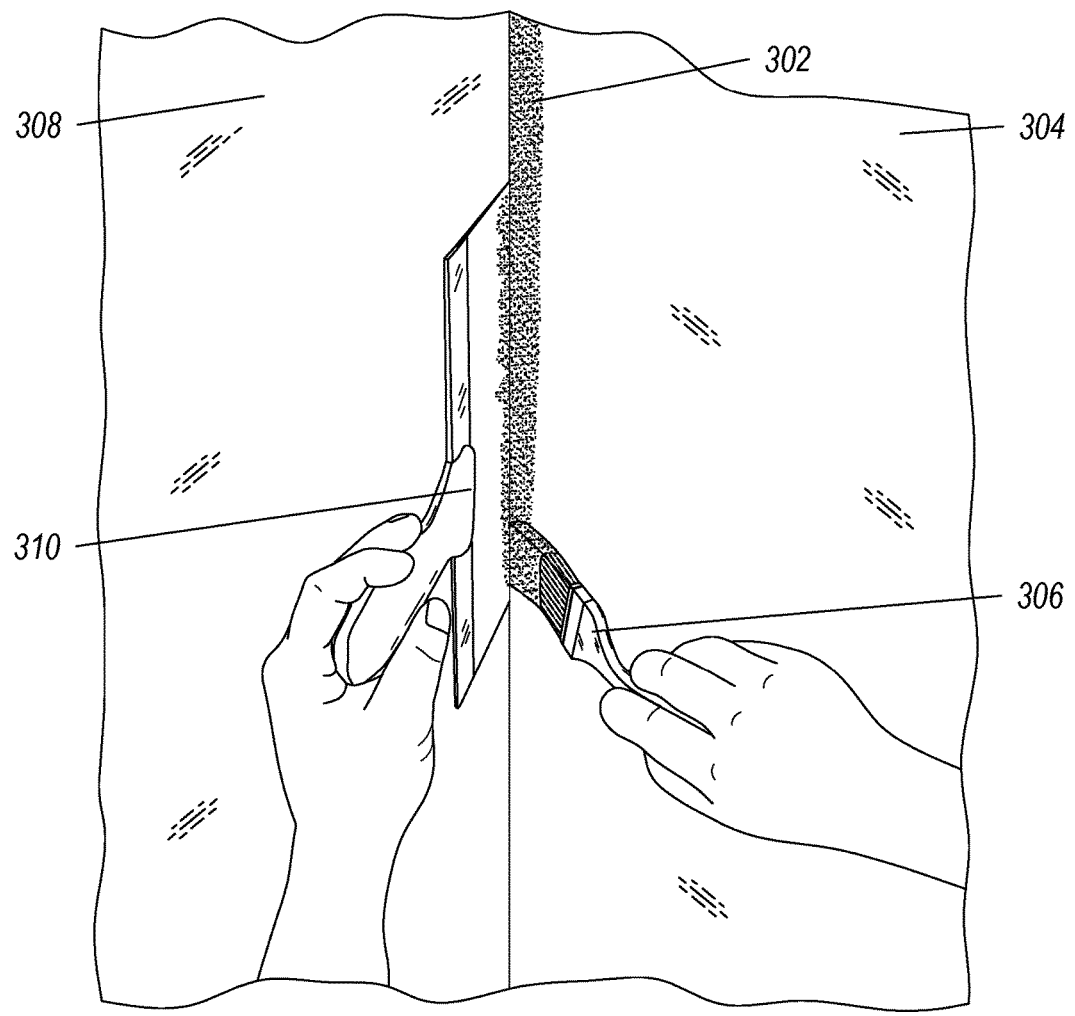
FIG. 3 illustrates an example of a protective compound being applied to a first surface.

FIG. 3 illustrates an example of a protective compound 302 being applied to a first surface 304. The protective compound is easy to apply and can be completely removed after curing when desired. That is the protective compound 304 is easy to apply and easy to remove, making it easy for a user to provide temporary protection to first surface 304.

The first surface 304 can include any desired porous or non-porous surface. For example, some surfaces which can be protected include canvas, brick, stone, wood, tile, cement, etc. The first surface 304 can be finished or unfinished. I.e., the first surface 304 can be painted, stained laminated, etc. Any finish on the first surface 304 will be protected from products which may cause damage, such as overspray from painting or abrasive materials.

FIG. 3 shows that the protective compound can be applied using a brush 306. The brush 306 is made by clamping the bristles to a handle with a ferrule. Bristles may be natural or synthetic. If the filaments are synthetic, they may be made of polyester, nylon or a blend of nylon and polyester. Filaments can be hollow or solid and can be tapered or untapered. The brush 306 can be dipped in the liquid, uncured, protective compound or the protective compound can be poured on the surface then spread using the brush. One of skill in the art will appreciate that the protective compound 302 can be applied in a multitude of ways and that the brush 306 is just one example of an application tool.

FIG. 3 also shows that the protective compound 302 can be prevented from being applied to a second surface 308. The second surface 308, for example, can be a surface that should not be protected. For example, if the second surface 308 requires finishing, such as painting or staining, then the second surface 308 may not have protective compound applied to the surface. For example, broad knife 310 can be used to prevent application of the protective compound on second surface 308. One of skill in the art will appreciate that other tools, such as a drywall knife, tape, etc. can be used to prevent application of the protective compound on the second surface 308. One of skill in the art will further appreciate that a tool need not be used to create a dividing line between the first surface 304 and the second surface 308, but may be if even lines, such as curves or straight lines, are desired. Because the viscosity of the protective compound is sufficiently high to prevent "bleeding" the tool can be immediately moved and used again and again to create longer borders between first surface 304 and second surface 308.

Figure 4:
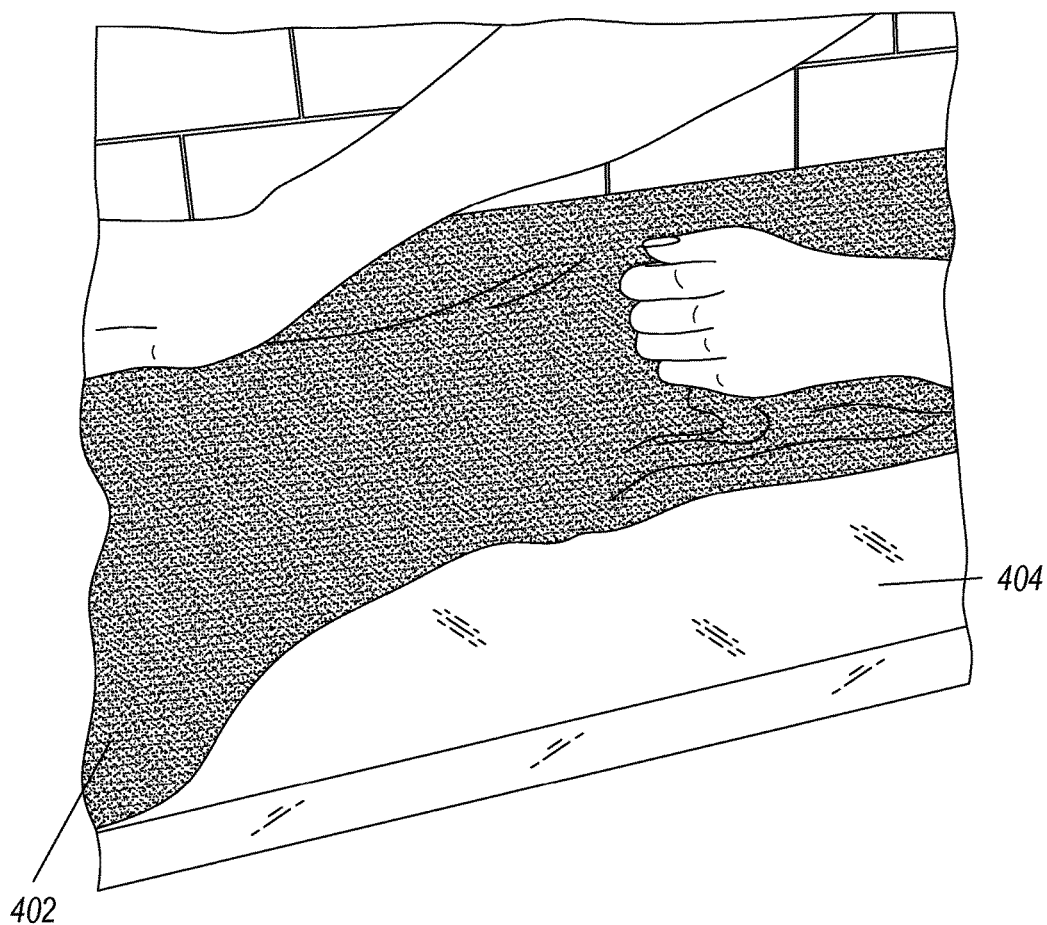
FIG. 4 illustrates an example of the cured protective compound being removed from a surface.

FIG. 4 illustrates an example of the cured protective compound 402 being removed from a surface 404. The cured protective compound 402 forms a continuous sheet but has only a low level of adherence to the surface 404. That is, the cured protective compound 402 adheres well to itself but not to other compounds allowing it to be removed by a user when desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A compound for creating a protective coating on a surface, the compound comprising:
   a natural rubber liquid mixture; and
   a latex paint added to the natural rubber liquid mixture;
   wherein the ratio of latex paint to natural rubber liquid mixture is between 1:32 and 1:48 by volume.

2. The compound of claim 1 further comprising one or more additives.

3. The compound of claim 1 further comprising:
   Ammonium Hydroxide.

4. The compound of claim 3 further comprising:
   Titanium Dioxide.

5. The compound of claim 4 further comprising:
   Distillates (petroleum), Hydrotrated heavy naphthenic;
   Sodium Hydroxide; and
   Sodium Silicate.

6. The compound of claim 5 further comprising:
4' 4 Diphelmethane Diisocynate;
Diethanolamine; and
Diphenylamine.

7. The compound of claim 6 further comprising:
Glycol Ethers; and
Ethanol.

8. The compound of claim 7 further comprising:
Ethyl Acetate; and
Formaldehyde.

9. The compound of claim 8 further comprising:
Methanol; and
Methyl Isbutyl Ketone.

10. The compound of claim 9 further comprising:
Naphthlene; and
Potassium Hydroxide.

11. The compound of claim 10 further comprising:
Quinoline;
Silica, quartz; and
Zinc Dimethyldithiocarbamate.

12. A compound for creating a protective coating on a surface, the compound comprising:
a natural rubber liquid mixture;
a latex paint added to the natural rubber liquid mixture; and
one or more additives, the one or more additives including:
4' 4 Diphelmethane Diisocynate;
Diethanolamine; and
Diphenylamine.

13. The compound of claim 12, wherein the ratio of latex paint to natural rubber liquid mixture is between 1:32 and 1:48 by volume.

14. The compound of claim 12 further comprising:
Ammonium Hydroxide.

15. The compound of claim 12 further comprising:
Titanium Dioxide.

16. The compound of claim 12 further comprising:
Distillates (petroleum), Hydrotrated heavy naphthenic;
Sodium Hydroxide; and
Sodium Silicate.

17. The compound of claim 12 further comprising:
Glycol Ethers; and
Ethanol.

18. The compound of claim 12 further comprising:
Ethyl Acetate; and
Formaldehyde.

19. The compound of claim 12 further comprising:
Methanol; and
Methyl Isbutyl Ketone.

20. The compound of claim 12 further comprising:
Naphthlene;
Potassium Hydroxide;
Quinoline;
Silica, quartz; and
Zinc Dimethyldithiocarbamate.

* * * * *